United States Patent
Yeh

(10) Patent No.: US 7,852,405 B1
(45) Date of Patent: Dec. 14, 2010

(54) METHOD AND APPARATUS FOR HIGH DEFINITION CAPTURE

(75) Inventor: Gerard Yeh, Redwood City, CA (US)

(73) Assignee: Zoran Corporation, Sunnyvale, CA (US)

( * ) Notice: Subject to any disclaimer, the term of this patent is extended or adjusted under 35 U.S.C. 154(b) by 1241 days.

(21) Appl. No.: 10/879,961

(22) Filed: Jun. 28, 2004

Related U.S. Application Data

(60) Provisional application No. 60/483,589, filed on Jun. 27, 2003.

(51) Int. Cl.
*H04N 11/24* (2006.01)

(52) U.S. Cl. ...................................... 348/445

(58) Field of Classification Search ................. 345/204, 345/603, 604, 520, 581, 531; 348/445, 495, 348/556, 469, 635; 386/37
See application file for complete search history.

(56) References Cited

U.S. PATENT DOCUMENTS

| | | | | |
|---|---|---|---|---|
| 5,805,173 A * | 9/1998 | Glennon et al. | ............. | 348/525 |
| 5,825,367 A * | 10/1998 | Shyu et al. | ................... | 345/668 |
| 5,877,741 A * | 3/1999 | Chee et al. | ................... | 345/629 |
| 5,905,536 A * | 5/1999 | Morton et al. | .............. | 348/441 |
| 6,317,192 B1 * | 11/2001 | Silverbrook et al. | ...... | 348/222.1 |
| 6,353,459 B1 * | 3/2002 | Yeh et al. | ..................... | 348/445 |
| 6,836,294 B2 * | 12/2004 | Miller et al. | ................. | 348/458 |
| 6,958,780 B1 * | 10/2005 | Kawai | ......................... | 348/458 |
| 2001/0043282 A1 * | 11/2001 | Hu | .............................. | 348/453 |
| 2003/0112372 A1 * | 6/2003 | Weaver et al. | ............... | 348/555 |
| 2004/0130552 A1 * | 7/2004 | Duluk, Jr. et al. | ........... | 345/506 |

\* cited by examiner

*Primary Examiner*—Chanh Nguyen
*Assistant Examiner*—Allison Walthall
(74) *Attorney, Agent, or Firm*—Frommer Lawrence & Haug LLP; Jamie L. Wiegand

(57) ABSTRACT

A method and apparatus for providing a high definition capture engine comprising an on-the-fly scaler to perform horizontal and vertical scaling as needed, prior to storage of the data in a buffer.

19 Claims, 7 Drawing Sheets

METHOD AND APPARATUS FOR HIGH DEFINITION CAPTURE

RELATED APPLICATIONS

The present invention is related to, and claims the benefit of U.S. Provisional Application No. 60/483,589, filed on Jun. 27, 2003. That application is incorporated by reference in its entirety.

FIELD OF THE INVENTION

The present invention relates to data capture, and more particularly to capturing high definition data, such as video and image data.

BACKGROUND

As more multi-media data becomes high definition, high definition capture devices that do not operate in real time are becoming less useful. In the prior art, a separate high definition capture and standard definition capture engine was used. However, many of the aspects of these capture engines are similar, leading to duplication, and an increased size of the end product.

SUMMARY OF THE INVENTION

A method and apparatus for providing a high definition capture engine comprising an on-the-fly scaler to perform horizontal and vertical scaling as needed, prior to storage of the data in a buffer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a High definition capture engine (HDC) is described. The HDC will transport either a high definition or standard definition digital video stream to main memory. In one embodiment, HDC supports VESA standard RGB pixel inputs so that computer graphics card output can be displayed on an HDTV monitor. The HDC, in one embodiment, provides a horizontal scaler and a vertical decimator to down sample the incoming data. The digitized input sampling formats, in one embodiment, are RGB/YCrCbNPrPb 4:4:4 or 4:2:2. The output sampling formats, in one embodiment, include YCrCb 4:2:2 or 4:2:0. In one embodiment, the 444 formats are sampled using a 12 b double-clocked interface. In one embodiment, both embedded sync and separate sync inputs are supported. A special mode for interfacing to chips using Intel's DVO standard is also available, in one embodiment. In one embodiment, 16 b double-clocked data interface with separate sync signals is used in this mode.

Figure 3A:
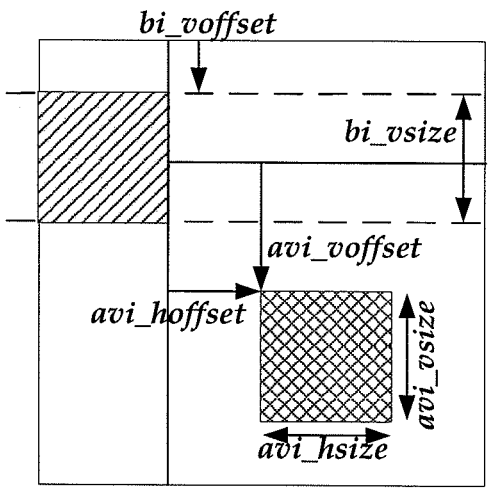
FIGS. 3A-C are figures illustrate three examples of subregion definition within the capturing region for high definition capture.
Figure 3B:
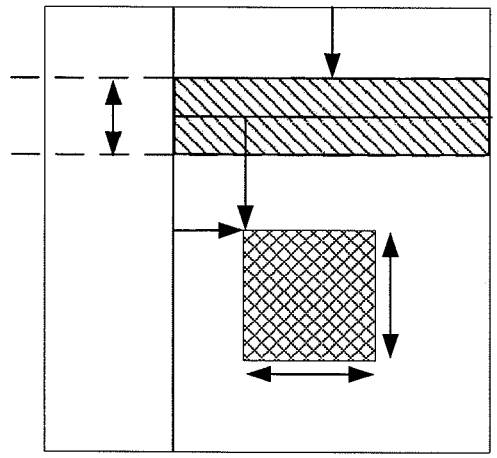
Figure 3C:
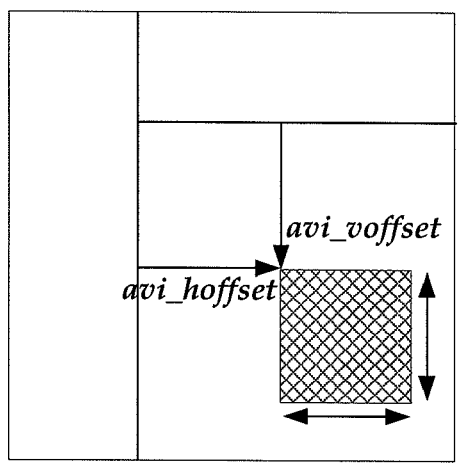
Figure 4:
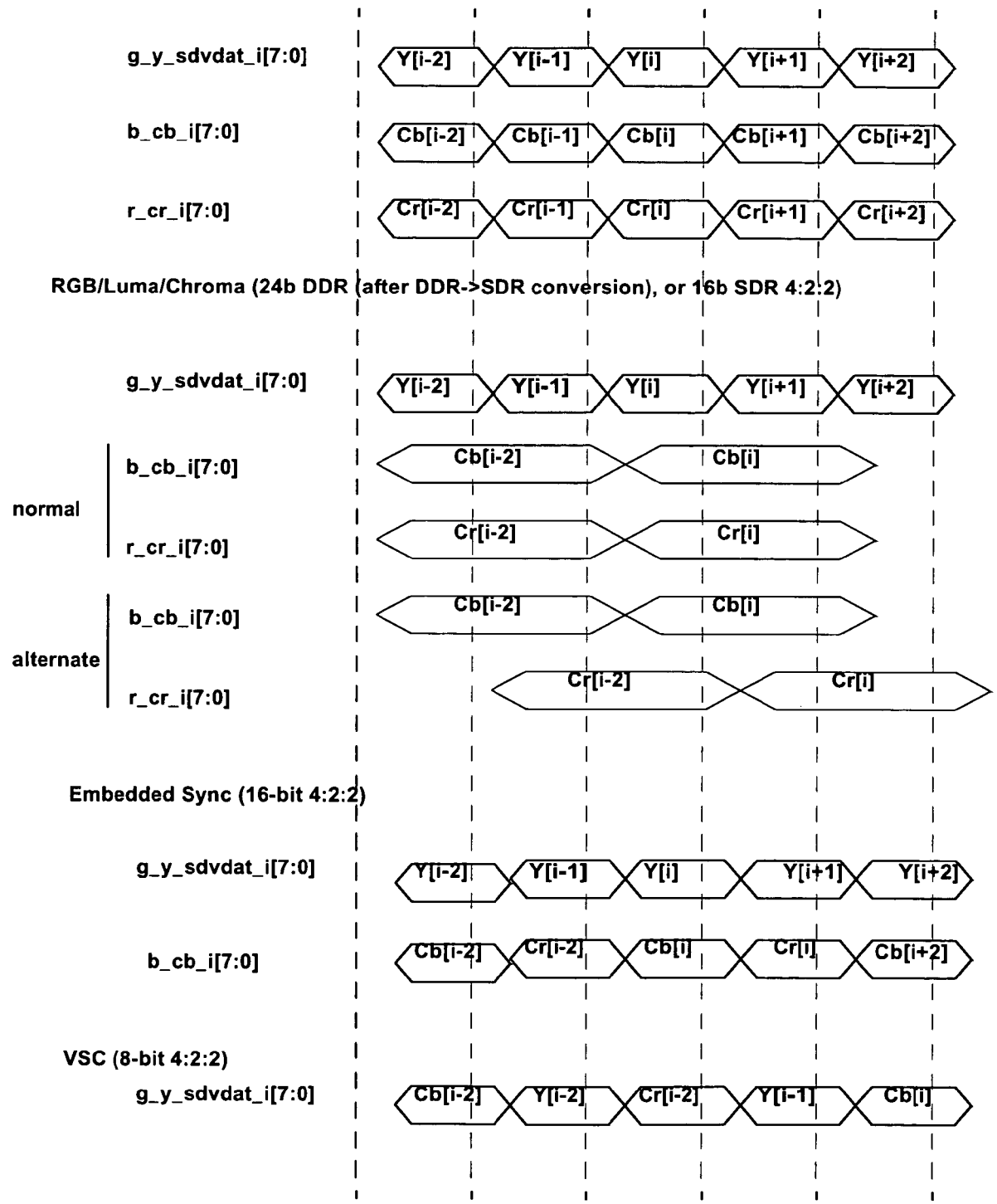
FIG. 4 is an illustration of embodiments of various synchronization schemes that the HDC can handle.

Since, the incoming data is a real-time video stream, HDC has to guarantee bandwidth with a reasonable internal buffer requirement. The Region of Interest (ROI) defines the area of the video stream that will be captured by the HDC. The potential ROIs for each field (interlace video) or frame (progressive video) are Horizontal Blank (HB), Vertical Blank (VB), and Active Video (AV) regions. All of these regions are supported for capture by the HDC. In one embodiment, it is not possible to capture all these ROIs at the same time. There are four capturing region capabilities: HB region, VB region, AV region, and VB/AV regions. The subregion definitions within a capturing region can be defined using the registers within the HDC. FIGS. 3A-C illustrate the ROIs which may be defined. In one embodiment, the offsets are stored in registers. FIGS. 3A-C illustrate the values that may be stored in the registers: bi_vsize, bi_voffset (defining the offsets of an area in the HB/VB region), and avi_voffset, avi_hoffset, avi_hsize, avi_vsize (defining the offsets of an area within the AV region). Of course the identification of these registers is arbitrary. Furthermore, alternative methods of identifying a region of interest in the HB/VB/AV regions may be used.

Figure 2:
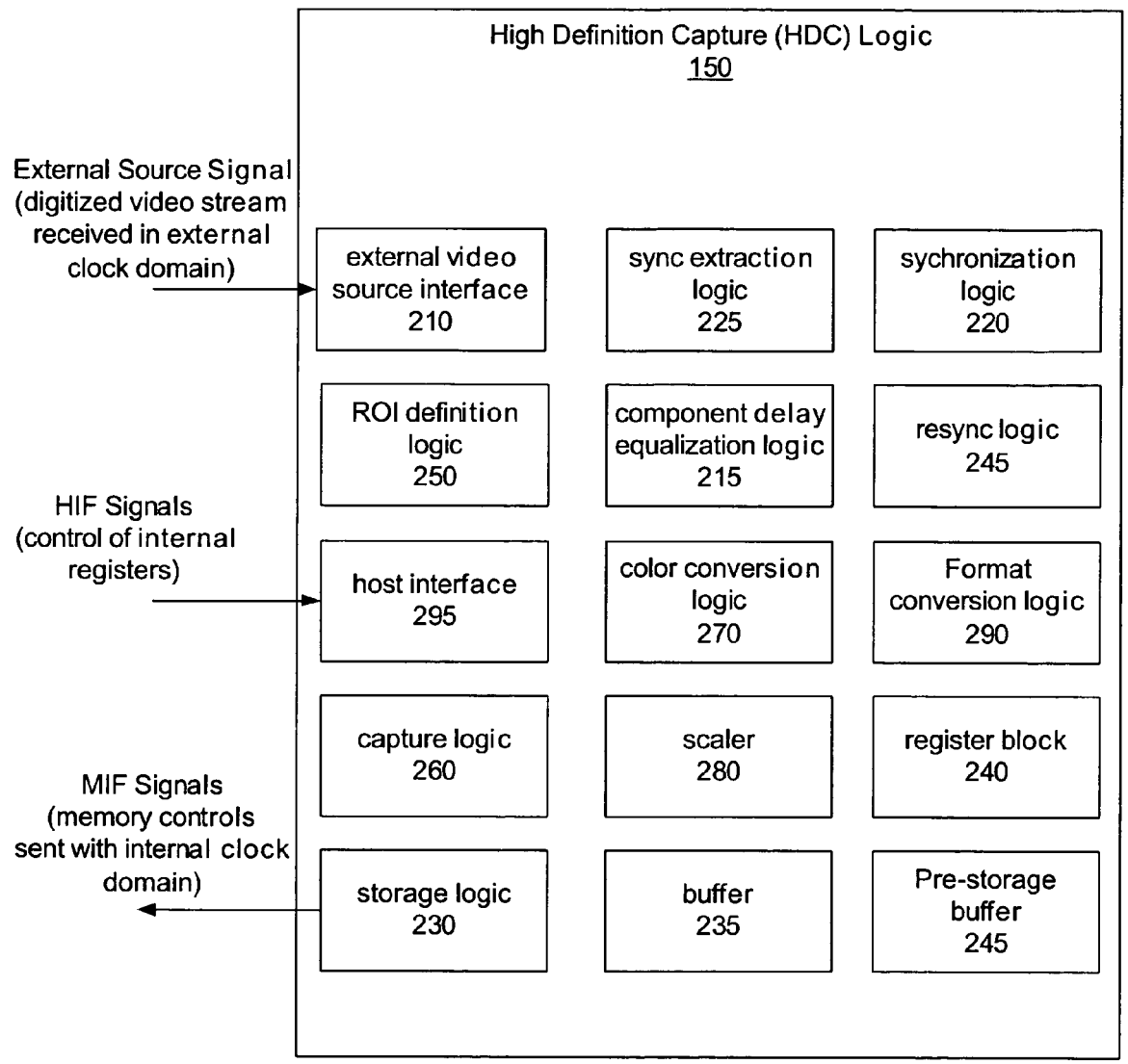
FIG. 2 is a block diagram of one embodiment of the high definition capture engine.

FIG. 2 is a block diagram of one embodiment of the HDC 150. The HDC supports incoming video in multiple formats. In one embodiment, the set of supported video formats is programmable by the user.

In one embodiment, the external video source interface 210 supports separate sync, 16 b embedded sync, and CCIR656 multiplex input modes for YCrCb pixel data. It also supports RGB input pixel data. For RGB pixel data, the input is in 4:4:4 sampling format, in one embodiment. In 444 mode, in one embodiment, the HDC receives data from an external triple ADCs with sync timing extraction (or a video decoder chip) and the data is presented over a 12 b double-clocked bus. In 422 sampling format embedded sync mode, a synchronization logic 220 will extract the sync characters embedded in the data stream to communicate horizontal and vertical timing information and the data is in 4:2:2 sampling format. In CCIR656 multiplex mode, the external video source interface receives data in CCIR656 multiplex order from a 8-bit data bus which is backward compatible with a standard definition input interface and the data is in 4:2:2 sampling format. Alternative data formats may be used to send data to the HDC.

The data received through the external video source interface 220 are synchronized to an external video clock, vclk. The data written out from the HDC 150 is written out using the core clock domain (global_clk), which is used throughout the television controller chip. The data is written out of the HDC 150 through storage logic 230 into external memory interface (MIF).

In one embodiment, another input to the HDC 150 is the HIF signals, which provide access to the internal registers of the HDC. The HIF interface is used by the host to set-up control registers and to read status registers of HDC. In one embodment, the host is the CPU 110.

In separate sync modes, in one embodiment, the video timings are extracted externally and conveyed to HDC by 'hsync' and 'vsync' signals. In Embedded Sync. Mode, the video timings are embedded into the data stream (in one embodiment on the Y component portion of the input bus). Sync extraction logic 225 extracts the timing information. In one embodiment, sync extraction logic decodes the byte with the 0xff__00__00 sequence. In one embodiment, the expected format for the incoming video is programmed into a format register in the register block 240 in the HDC 150. Basic information about the incoming raster structure (number of blanking lines/active lines/blanking pixels/active pixels is programmed into the register block 240, in the modes with explicit flags marking the regions in the raster structure (embedded sync and separate sync levels). In one embodiment, some registers and associated logic circuits in the register block can be used to detect the number of lines/pixels per line in each region of the incoming raster structure.

The synchronization to the incoming video raster structure is designed to be programmable so that HDC 150 can interface to variety of different video/graphics sources. In one embodiment, the particular synchronization mode is specified in a register in register block 240. Synchronization logic 220 uses this data to obtain the synchronization information. In one embodiment, the supported synchronization modes are: Separate sync pulse mode (transitions on hsync and vsync are treated as synchronization pulses), Separate sync level mode (hsync and vsync are treated as flags that mark regions in the coming raster structure), and Embedded sync. mode ("end of active video" (EAV) and "start of active video" (SAV) from the stream are used to generate flags that mark regions in the incoming raster structure).

In separate pulse sync mode, an externally provided horizontal sync signal will be used to extract line timing. The register value will indicate the number of clock cycles from the arrival of the active edge of the horizontal sync signal until the start of active video. Synchronization extraction logic 220 will count up to the number of clock cycles indicated by the register value without considering those are video samples. After that, HDC 150 will treat the next samples as video samples. Similarly, an externally provided vertical sync signal will be used to extract field timing. The register value will indicate the number of scan lines following the vertical sync signal to be blanking lines. A value of zero in the register indicates vertical sync occurs on a line that contains active video (i.e. no blanking lines).

In separate sync level mode, an externally provided horizontal sync signal will be used to extract line timing. The blanking level of this signal will indicate the number of clock cycles from the arrival of the leading edge of the horizontal sync signal until the start of active video. HDC will use the active level as an indicator as without considering those are video samples. Starting from the trailing edge of the horizontal sync signal, HDC will treat the next line of samples as video samples. Similarly, for vertical synchronization, an externally provided vertical sync signal will be used to extract field or frame timing. The blanking level of this signal will indicate the number of scan lines following the vertical sync signal to be blanking lines.

In embedded sync. mode, the sync extraction logic 225 detects a preamble signal. In one embodiment, the preamble signal is (FF, 00, 00). The byte received after that is latched and bits [6:4] of the byte are used as H, V and F flags.

The HDC 150 is capable of capturing incoming video or data according to a region of interest (ROI) definition. The ROI for video capture is defined by specifying horizontal and vertical offsets and sizes to define a rectangular sub-region in the incoming stream. The ROI for data capture is specified by defining vertical offset and size and a flag that indicates whether the horizontal blanking portion of the line or the active video portion of a line are to be captured as blanking. Of course, other types of ROI definition for video and data captures are available. In one embodiment, the video and data ROIs to be captured are not allowed to overlap. ROI definition logic 250 identifies the region of interest, using data in the register block 240. The capture logic 260 captures the region of interest data.

Color conversion logic 270 can convert the incoming data stream to a preset color space for subsequent storage, processing, display, or re-transmission.

Scaler 280 provides horizontal and vertical scaling. The HDC 150 is capable of horizontal downscaling and horizontal upscaling. In one embodiment, the downscaling factor can be any fraction truncated to 20 bits, while the upscaling factor is fixed to 7:9. In one embodiment, horizontal downscaling is performed using the Fant algorithm. In one embodiment, vertical scaling operation is limited to decimation (line dropping). Every Nth line will be considered valid, where N can be 2 or 4. In one embodiment, vertical decimation is accomplished by dropping all lines whose indices are a multiple of 2, 4 or 8 (the last ratio is used when both downscaling by 4 and 422-420 conversion is enabled. The line dropping is accomplished by not generating pixel valid, first and last signals for the lines that are to be skipped in a particular mode. In another embodiment, vertical interpolation is used to scale the video data vertically.

Format conversion logic 290 can be used to convert data from 444/422 to 420. In one embodiment, format conversion is accomplished in a manner very similar to the vertical scaling. Every other chroma line is dropped when this feature is enabled. In another embodiment, vertical interpolation is used to reduce or re-sample the chroma video data.

Component delay equalization is used to assemble a whole pixel out of components (R, G and B, or Y, Cb, and Cr) that are received by HDC at different time points. This situation can arise in 8 b or 16 b sampling modes and a just statically adding a cycle or two of extra delay for the chroma components in these modes is not a solution since the use of the VACT signal can cause an indefinite delay between the reception of the luma sample and the reception of its corresponding chroma samples. The component delay equalization logic 215 includes registers for all of the components and a state machine that only signals valid once all components of a pixel received. In one embodiment, the state machine is reset at the beginning of every line or frame even if the last pixel of the previous line has not been completed. The capturing bandwidth requirement is constrained per scan line basis. Therefore, in one embodiment, the internal buffers are drained and stored to external memory before capturing the data of the next scan line.

Figure 1:
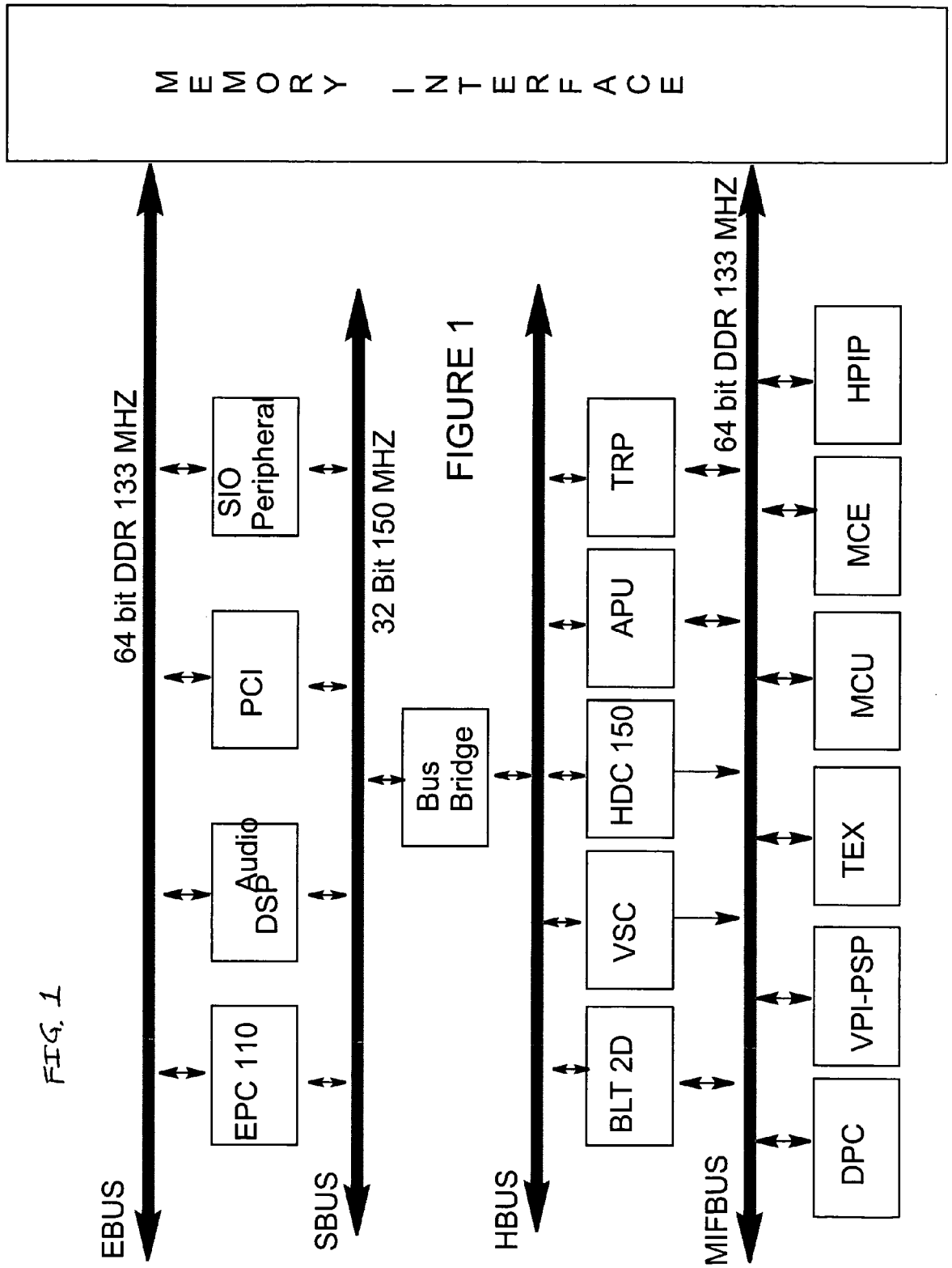
FIG. 1 is a block diagram of one embodiment of a television controller system in which the high definition capture engine can be implemented.

The HDC 150 operates in two different frequencies including pixel data sampling clock (vclk) and core clock (global_clk). In one embodiment, the bulk of video processing is done in the vclk domain. The processed video or data is synchronized to the domain using resync logic 245. In one embodiment, resync logic 255 is a small asynchronous FIFO. In one embodiment, in global_clk domain the data is, optionally, upscaled in the horizontal direction and then written into a large buffer 240 where it waits to be either written to the MIF by memory interface 230, or to be written to a display processor unit (DPC.) FIG. 1 shows the DPC, coupled to MIF-bus. The DPC interface is similar but considerably simpler than the MIF interface. It emulates a MIF buffer read client for DPC. Once a certain amount of pixel data is present in the interface buffer FIFOs, the HDC signals DPC that it has data ready. The DPC in turn requests (reads) the data from DPC according to a protocol similar to the MIFs buffer read protocol.

In one embodiment, the data flags are in-line, thus control signals travel through the pipeline along with the data. In one embodiment, a 5-bit flag accompanies the data word/pixel at the output of every stage of the design. The results from each stage are different based on the functionality of the stage, hence, some of the flags are not used in some stages.

In one embodiment, the flow controls of each pipe stage within the video clock domain follows a simple "one-way" data transfer protocol with "valid", "first", and "last" signals. The flow control is one-way because HDC is a real-time unit, which does not have any capability to stop the incoming video streams. "Valid" indicates the validity of the data, "first" indicates first piece of data to be captured for each scan line (the processing pipe line in HDC operates on per-scan line basis) and "last" indicates last piece of data to be captured for each scan line.

The register synchronization scheme that is used in the design is described below. By considering the video clock domain (video processing pipeline) as a "consumer" and the core clock domain (register file access via HIF) as a "producer", one can use a full-handshake protocol to transfer data from HIF's register file to the video register file without any assumption on the relative ratio between those two clock domain. In one embodiment, the "producer" will not produce any new data until the "consumer" is ready to accept. In one embodiment, the "consumer" will be ready to accept new data at each Start of Field provided that the previous full handshake data transfer is completed.

Synchronization to the real-time video being captured sometimes is needed for subsequent storage, processing, display, or re-transmission, In one embodiment, the start of a video line or a particular pixel is detected by digital logic. The detection information are encoded as an interrupt signal to a CPU host. In one embodiment, interrupt synchronization from the vclk domain to the global_clk domain is performed with the help of a double synchronization mechanism. In one embodiment, the interrupt pulse is first fed into the S input of an S-R flip-flop, the output of that flip-flop is fed into a synchronizer (double flop) clocked at the core clock (global_clk) domain, the output of that synchronizer is fed into another synchronizer (back from global_clk to vclk domain), the output of this return synchronizer is used as the R signal to reset the SR flip-flop. The return synchronization path serves to acknowledge transmission of the interrupt signal from vclk domain to the global_clk domain. This enables interrupts across clock domains.

In one embodiment, as shown in FIG. 1, a unified memory 120 supports the HDC 150, along with the other components of the system. Thus, in one embodiment, the HDC only includes local buffering. In one embodiment, the size of the buffer 235 is enough to tolerate the latency imposed by the MIF (external memory interface). In one embodiment, the MIF requires individual units to store the Luma (Y) and Chroma (Cb, Cr) into different MIF buffers 235. Hence, the luma and chroma samples are separated in the first pipeline stage and are subsequently sent through two different (separate) processing into write-to-memory pipelines.

In one embodiment, the HDC is further capable of auxiliary data capture from the luma input lines (during blanking periods).

In one embodiment, HDC 150 interfaces to a host device, through a host interface 295, which couples to an external HIF interface. In one embodiment, the external HIF interface handles one or more of the following: HIF interface state machines, configuration registers and their vclk domain shadow registers, state machines that update the shadow register file in vclk domain from the configuration register in the global_clk domain once per 2-field (or 2-frame) period, and interrupt event synchronization to global_clk and generation/clearing of HIF interrupts.

The memory interface state machines read data from the large (ram_based) buffers in HDC and write it to the buffers in the MIF at double-word granularity. Once an HDC buffer in the MIF is full, end-of line is reached, or end of blanking interval is reached a request is made for the MIF to schedule writing the buffer in question to DDR SDRAM. Once this request is made, HDC switches to writing data to another one of its buffers in the MIF (ping-pong buffering mechanism). Once the MIF is ready to start transferring the buffer to system memory, it issues a CMAT signal to HDC, which responds by sending out the descriptor for the data that is being sent to DDR. The HDC has two MIF clients, the luma client and the chroma client, each of the clients has three buffers in the MIF for 3-entry FIFO operation. The chroma client is only used in 2d access mode for storing video. The luma client is used in either 2d access mode (for storing video), or linear access mode for storing auxiliary data captured during blanking periods. Based on the B flag accompanying the particular double word that is to be written, the HDC Luma client interface formats the descriptors sent to MIF in either 2d format or linear format. Since 3-entry FIFO buffers exist for each MIF client in the HDC, at a maximum three transactions with the MIF can be pending at any given time. Since the memory address or descriptor information is only sent after the data is ready to be moved from the buffer in the MIF to the system SDRAM, this information needs to be stored somewhere so that the HDC can keep capturing data to free buffers while it is waiting for the MIF to respond to previous memory write descriptors or requests. The data structure that makes the most sense for this storage is a FIFO, thus HDC has a 3-deep FIFO for storing descriptor data waiting for its turn to be sent to the MIF. The descriptor is pushed into the FIFO when a buffer available is signaled for a buffer in the MIF, the next descriptor is popped from the FIFO once descriptor request is received from the MIF, at this time the descriptor is sent to the MIF according to the normal descriptor bus protocol.

Figure 5:
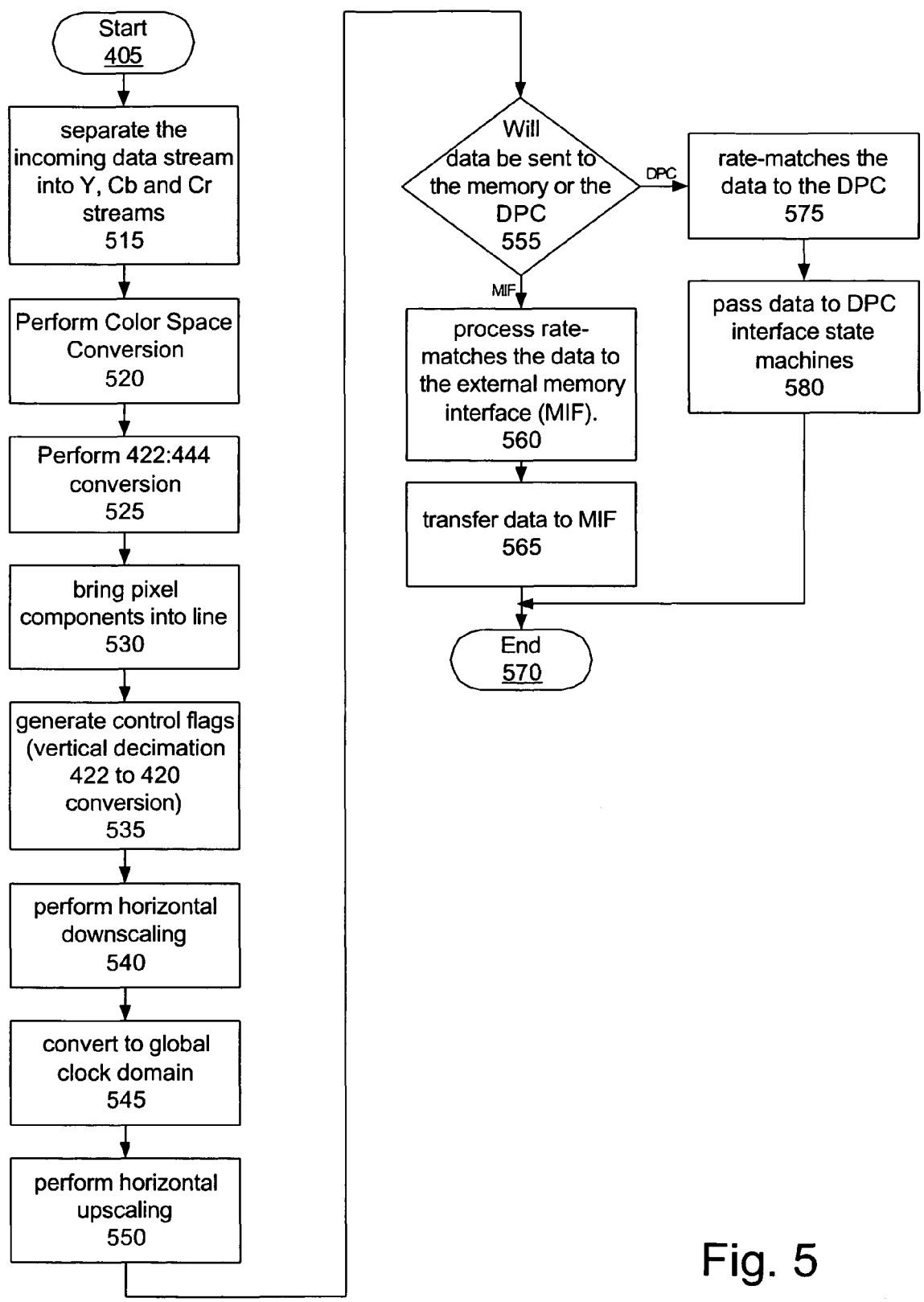
FIG. 5 is one embodiment of flowchart of high definition capture.

FIG. 5 is a flowchart of one embodiment of the stages of processing within the HDC. In one embodiment, the data-flow stage is the stage when data is initially received and processed. The second stage is horizontal down-scaling. The third stage synchronizes to the global clock domain, and performs other synchronization related steps.

At the first stage, at block 515, the process performs sample extractions which separate the incoming data stream into Y, Cb and Cr streams.

At block 520, the process performs a Color Space Conversion.

In one embodiment, the following color conversion may be performed: RGB to HD YUV, RGB to SD YUV, and HD YUV to SD YUV. In one embodiment, the input RGB is gamma-corrected with a 0 to 255 range and the YCbCr is a scaled and offset version of YUV color space. For high definition, Y has a 16 to 235 nominal range while Cb and Cr has a 16 to 240 nominal range in an eight bit system. The standard equations defined in standards such as SMPTE 274M are used to generate the conversion. In one embodiment, for Y signal, the undershoot and overshoot in video processing may be accommodated by the use of codewords 1 through 15 and 236 through 254 respectively in an eight-bit system. For Cb and Cr signals, the undershoot and overshoot are accommodated by the use of codewords 1 through 15 and codewords 241 through 254 respectively. For standard definition output, it is achieved by converting HD YUV to SD YUV.

At block 525, the process performs a 422 to 444 conversion. In one embodiment, the 422 to 444 conversion is performed by chroma sample duplication. This facilitates horizontal scaling as both luma and chroma has the same number of horizontal samples and shares the same scaling controller. In one embodiment, the format conversion is simply implemented by replicating the chroma samples separately (Cb and Cr) because the only differences between 4:2:2 and 4:4:4 are within the chroma pixels not the luma pixels.

At block 530, the component delay equalization logic brings all of the pixel components in line. This process is used when 8 b or 16 b input modes are used, especially if VACT changes on non-pixel-boundary vclk cycles.

At block 535, control flags are generated. In one embodiment, control flag generation is used for vertical decimation and/or 422 to 420 conversions. By blocking the generation of pixel valid control flags for lines that are multiple of 2, 4 or 8, depending on vertical scaling and 422-420 conversion register settings, effective scaling is achieved.

At block 540, the process performs horizontal downscaling. In one embodiment, horizontal downscaling is implemented using the Fant algorithm. The Fant algorithm essentially takes the average of W source pixels to generate one scaled pixel where W is the factor with which the image is to be scaled down by. W can be a fractional number so non-integer scaling factor can be achieved. The non-integer window size, W, is achieved by adapting the weight of the end points according to the proximity of the interpolated pixel. In one embodiment, the algorithm is implemented in C model as follows: assume the down-scaled image to have a pixel width of 1 unit and the original image has a pixel width of M/N unit where N<=M. The downscale factor is therefore N/M. In principle W=M/N pixel is needed to generate one scaled pixel. Since M/N can be a fractional number, the two fractional and weighted ends are taken to generate a normalized scaled pixel along with integer pixels in between two ends. The implementation of this algorithm, in one embodiment, only uses only a single pixel buffer, and a MAC (2 for worst case). In theory, the Fant algorithm is equivalent to a traditional Polyphase 2-tap sinc function when the scale factor is between 1 and ½. With scale factor less than ½, the Fant algorithm acts as a Polyphase Low Pass down sampling filter.

At block 545, the data is transferred from the pixel sampling clock to the global clock domain. In one embodiment, an asynchronous FIFO (first-in first-out buffer) is used. In on embodiment, the data is read into the FIFO using the pixel sampling clock, and read out of the FIFO using the global clock.

At block 550, horizontal upscaling is performed, if needed. In one embodiment, bilinear filtering is used for the horizontal upscaling. The horizontal up-scaler is implemented using linear interpolation between consecutive samples. A DDA is used to determine the 'locations' of valid upscaled pixels in between two consecutive samples.

At block 555, the process determines whether the data will be sent to the memory or the DPC. If the data is sent to the memory, at block 560, the process rate-matches the data to the external memory interface (MIF). In one embodiment, the data is then transferred to the MIF interface, at block 565. The process then ends at block 570. In one embodiment, the MIF interface, which is outside the HDC itself, is responsible for the following functions: MIF Interface state machines, address generation for 2d (video) and 1d (data) writes, and the token queue that enables HDC to have multiple pending write requests for the MIF.

In one embodiment, command tokens are used to convey line timing info as well as the MIF transfer size to the other frequency Domain. Both of the MIF's descriptor control and data control use these tokens to issue proper requests to the MIF. Since, the operating mode bits are updated in the core clock domain through the HIF interface and some of these bits are used by the capturing engine operating in the pixel clock (vclk) domain, these bits are carefully handled when transferred across the frequency boundary.

If, at block 560, it was determined that the data is to be sent to the DPC, the process rate-matches the data to the DPC, at block 575. In one embodiment, large, on-chip memory-based buffers are used for the rate matching. At block 580, the data is passed to the DPC interface state machines. The process then ends, at block 570. In one embodiment, there is no datapath logic in the HPC itself. The outputs of a memory-based buffer are hooked up to the MIF write-bus or the DPC read-bus.

In one embodiment, control is divided into luma and chroma control pipelines. At the end of each pipeline, there is a token queue which is used to pass commands to MIF frequency domain per MIF descriptor basis. Hence, the pipelines are responsible to partition a scan line into different MIF buffers. There are three pipe stages in Luma pipeline and four pipe stages in Chroma pipeline before the token FIFOs, in one embodiment. Each pipe stage provides only one-way communication signaling because this is an isochronous as far as video capture. There is no flow control back to the video source direction.

One issue that the above-described HDC system does not handle is if the external clock, vclk, is lost. The system may hang, or fail in some other way. The embodiment described below solves this problem by providing an internal clock, with a frequency higher than the pixel sampling clock (vclk.) In one embodiment, the internal clock is the same as the core clock (global_clk.) The higher frequency internal clock is used to sample the vclk in order to measure the pixel clock or vclk period. The clock period measurement of vclk may be used to detect a frequency change in the incoming data stream. This sampling circuits can be a phase detector circuits of a phase lock loop (PLL.) Through the PLL, a secondary clock is generated that will lock to the frequency of vclk.

In one embodiment, the HDC processing, described above, is performed using the internal clock, or a secondary clock derived from the internal clock using a PLL. If the internal clock is used for processing, the vclk period measurement circuits will generate a validate signal to enable HDC processing circuits at a rate locked to the input data rate. The synchronization to the internal or secondary clock occurs immediately upon signal acquisition through an asynchronous FIFO. All further processing is performed using the high speed internal clock, or a secondary clock derived therefrom.

Figure 6A:
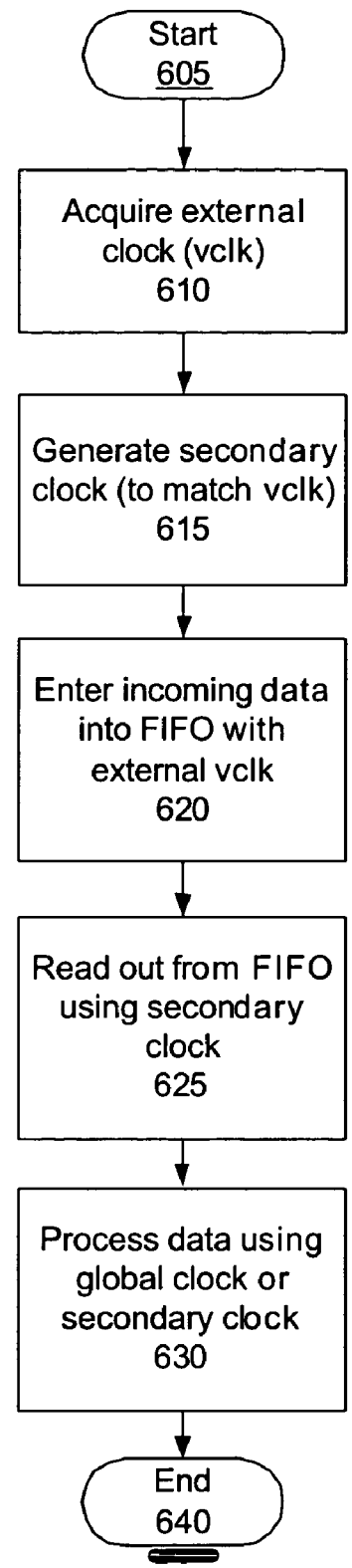
FIG. 6A is a flowchart of one embodiment of using an alternative clocking scheme.

FIG. 6A is a flowchart of one embodiment of this method. At block 605, an incoming video data signal is received.

At block 610, the system acquires the external clock, vclk, which is associated with the incoming video data signal.

At block 615, the system generates a secondary clock. The secondary clock is a division of the high speed internal clock, which is set to match the vclk in frequency. In another embodiment, valid signals are generated, to trigger action on selected edges of the high speed internal clock, such that the rate is matched to the vclk data.

At block 620, the incoming data is entered into an asynchronous FIFO with input clock as vclk. The FIFO circuits update the FIFO state on the same vclk clock edge as the valid input data because loss of vclk can occur immediately after the present clock. This requirement ensures a correct FIFO write state update for the subsequent FIFO read by the internal or secondary clock domain.

At block 625, the incoming data in the FIFO is read and to be processed by the circuits using the secondary clock. In one embodiment, the high speed internal clock is same as the core clock (global_clk.)

At block 630, the processing described above (separating incoming streams into Y, Cb, and Cr, Color space conversion, 422:444 conversion, component delay equalization, Control Flag generation (vertical decimination/422:420 conversion), Horizontal downscaling, Horizontal upscaling, Rate matching with DPC/MIF) is performed. In one embodiment, the processing is done using the global clock. In another embodiment, the high speed secondary clock is used. The process then ends at block 640.

Figure 6B:
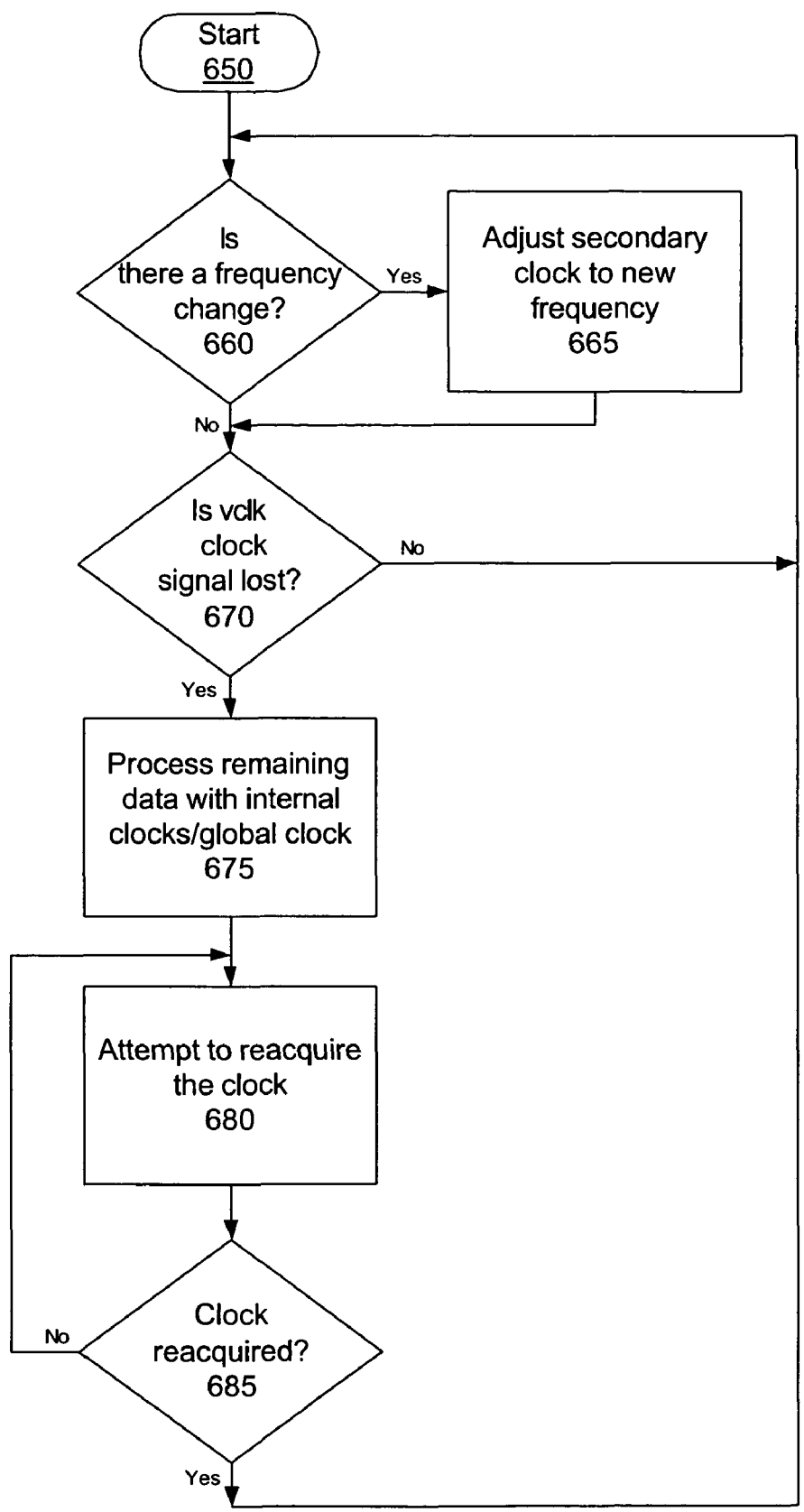
FIG. 6B is a flowchart of one embodiment of monitoring the external clock, using the high speed internal clock.

FIG. 6B illustrates one embodiment of the monitoring performed by the high speed internal clock. The process starts at block 650.

At block 660, the process determines whether there is a frequency change in the incoming vclk as measured by a change in time between consecutive vclk rising transitions. In one embodiment, the system continuously monitors the frequency of the vclk. If there is a frequency change, at block 665 the secondary clock via a PLL, is adjusted to ensure that the incoming data is processed with a properly rate matched clock. In another embodiment, the valid signals used with the high speed internal clock, for rate matching, are adjusted.

At block 670, the process determines if the incoming clock has gone away. Again, this is continuously monitored. In that case, at block 675, the remaining data in the HDC, which is a real-time on-the-fly processor, is processed using the high speed secondary clock. This ensures that all of the data that is received by the HDC is properly processed, even if the HDC loses the vclk signal at the input.

At block 680, the system attempts to reacquire the vclk, to ensure that the frequency does not change. At block 685, the process determines whether the clock has been successfully reacquired. If not, the process returns to block 680, to continue attempting to reacquire a clock. In one embodiment, an interrupt is generated to notify host of the loss-of-input-clock. In one embodiment, once all data int the HDC is processed, the HDC shuts down, or powers down, until a new clock signal is acquired. When the clock is reacquired, the process returns to block 660, to continue monitoring the HDC.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for capturing a video data stream, the system comprising:
   a plurality of signal buses operatively coupled together, including a video data bus and a memory interface bus;
   a memory interface; and
   a high definition capture (HDC) engine configured to:
   capture high definition video data in real-time, the high definition video data having one of a plurality of formats;
   capture a first region of interest (ROI) for video capture, specified as a sub-region in the video data stream using at least one of a vertical offset, a horizontal offset, a vertical size, and a horizontal size, the first ROI being smaller than an entire display screen;
   capture a second ROI for data capture, specified as another sub-region in the video data stream that is non-overlapping with the first ROI for video capture using another vertical offset and another vertical size, and an indicator that indicates whether the second ROI includes a selected one of a horizontal blanking portion or an active video portion of the video data stream for capture as blanking data; and
   perform video data format conversion within the captured first ROI using one of decimation or interpolation.

2. The system of claim 1, wherein the HDC is further configured to extract synchronization information from the high definition video data, the synchronization information including different synchronization signal encoding types.

3. The system of claim 1, wherein the HDC is further configured to convert a color space of the high definition video data.

4. The system of claim 1, wherein the first ROI comprises any portion of an active video.

5. The system of claim 1, wherein the first ROI is user defined.

6. The system of claim 1, wherein video data format conversion comprises at least one of a 422 to 444 conversion or a 422 to 420 conversion.

7. A method of capturing a video data stream, the method comprising:
   receiving a video data stream representing pixels, the video data stream having one of a plurality of formats and a plurality of components;
   capturing a first region of interest (ROI) for video capture, specified as a sub-region in the video data stream;
   capturing a second ROI for data capture, specified as another sub-region in the video data stream that is non-overlapping with the first ROI for video capture using a vertical offset and a vertical size, and an indicator that indicates whether the second ROI includes a selected one of a horizontal blanking portion or an active video portion of the video data stream for capture as blanking data; and
   separating the plurality of components into a plurality of corresponding data streams;
   performing a color space conversion on the plurality of corresponding data streams;
   performing component delay equalization to synchronize the plurality of corresponding data streams;
   generating control flags for vertical scaling;
   performing horizontal down-scaling on the plurality of corresponding data streams;
   changing pixel sampling rate from a pixel sampling clock rate to a global clock rate; and
   performing horizontal up-scaling on the plurality of corresponding data streams.

8. The method of claim 7, further comprising matching a rate of data sampling of the video data stream to a rate of a memory interface used for storing the video data stream in a computer memory.

9. The method of claim 7, further comprising using command tokens to convey timing information about the video data stream to a memory interface used for storing the video data stream in a computer memory.

10. The method of claim 7, further comprising an internal clock having a frequency higher than an external pixel clock associated with the video data stream, the internal clock being used for processing the video data stream if the external pixel clock is lost.

11. A device for capturing a video data stream, the device comprising:
   an external video source interface for receiving a video data stream representing pixels, the video data stream having one of a plurality of formats and synchronization information including one of a plurality of synchronization signal encoding types;
a sync extraction module for extracting synchronization information from the video data stream;
a region of interest (ROI) module for defining a first ROI for video capture, the first ROI being specified as a sub-region in the video data stream using at least one of a vertical offset, a horizontal offset, a vertical size, and a horizontal size, and for defining a second ROI for data capture as another sub-region in the video data stream that is non-overlapping with the first ROI for video capture using another vertical offset and another vertical size, and an indicator that indicates whether the second ROI includes a selected one of a horizontal blanking portion or an active video portion of the video data stream for capture as blanking data;
a capture module for capturing the first ROI and the second ROI within the video data stream;
a component delay equalization module for synchronizing different pixel components within the captured first ROI;
a color conversion module for converting a color space of the video data stream within the captured first ROI; and
a scaler module for performing vertical and horizontal scaling of the video data stream within the captured first ROI.

12. The device of claim 11, further comprising:
a high speed internal clock to acquire a pixel data clock associated with the video data stream; and
a FIFO buffer to resample the video data stream using an internally generated clock based on the high speed internal clock.

13. The device of claim 11, further comprising a resampling logic to resample video data using an internally generated clock, such that no data is lost if an external clock signal is lost.

14. The device of claim 11, wherein the synchronization signal encoding types include embedded synchronization, pulse based separate synchronization, and level based separate synchronization.

15. The device of claim 11, further comprising a display processing unit.

16. A non-transitory unified memory having instructions encoded thereon that when executed perform actions comprising:
receiving a video data stream representing pixels, the video data stream having one of a plurality of formats and a plurality of components;
capturing a first region of interest (ROI) for video capture, specified as a sub-region in the video data stream;
capturing a second ROI for data capture, specified as another sub-region in the video data stream that is non-overlapping with the first ROI for video capture using a vertical offset and a vertical size, and an indicator that indicates whether the second ROI includes a selected one of a horizontal blanking portion or an active video portion of the video data stream for capture as blanking data;
separating the plurality of components into a plurality of corresponding data streams;
performing a color space conversion on the plurality of corresponding data streams;
performing component delay equalization to synchronize the plurality of corresponding data streams;
generating control flags for vertical scaling;
performing horizontal down-scaling on the plurality of corresponding data streams;
changing pixel sampling rate from a pixel sampling clock rate to a global clock rate; and
performing horizontal up-scaling on the plurality of corresponding data streams.

17. The unified memory of claim 16, wherein the color space conversion comprises one of RGB to High Definition YUV, RGB to Standard Definition YUV, or High Definition YUV to Standard Definition YUV.

18. The unified memory of claim 16, wherein the horizontal down-scaling is performed using the Fant algorithm.

19. The unified memory of claim 16, wherein the vertical scaling is performed using vertical decimation.

* * * * *

UNITED STATES PATENT AND TRADEMARK OFFICE
CERTIFICATE OF CORRECTION

| | | |
|---|---|---|
| PATENT NO. | : 7,852,405 B1 | |
| APPLICATION NO. | : 10/879961 | |
| DATED | : December 14, 2010 | |
| INVENTOR(S) | : Gerard Yeh | |

It is certified that error appears in the above-identified patent and that said Letters Patent is hereby corrected as shown below:

In column 10, line 37, in claim 7, after "data;" delete "and".

Signed and Sealed this
Nineteenth Day of April, 2011

David J. Kappos
*Director of the United States Patent and Trademark Office*